Patented Mar. 16, 1948

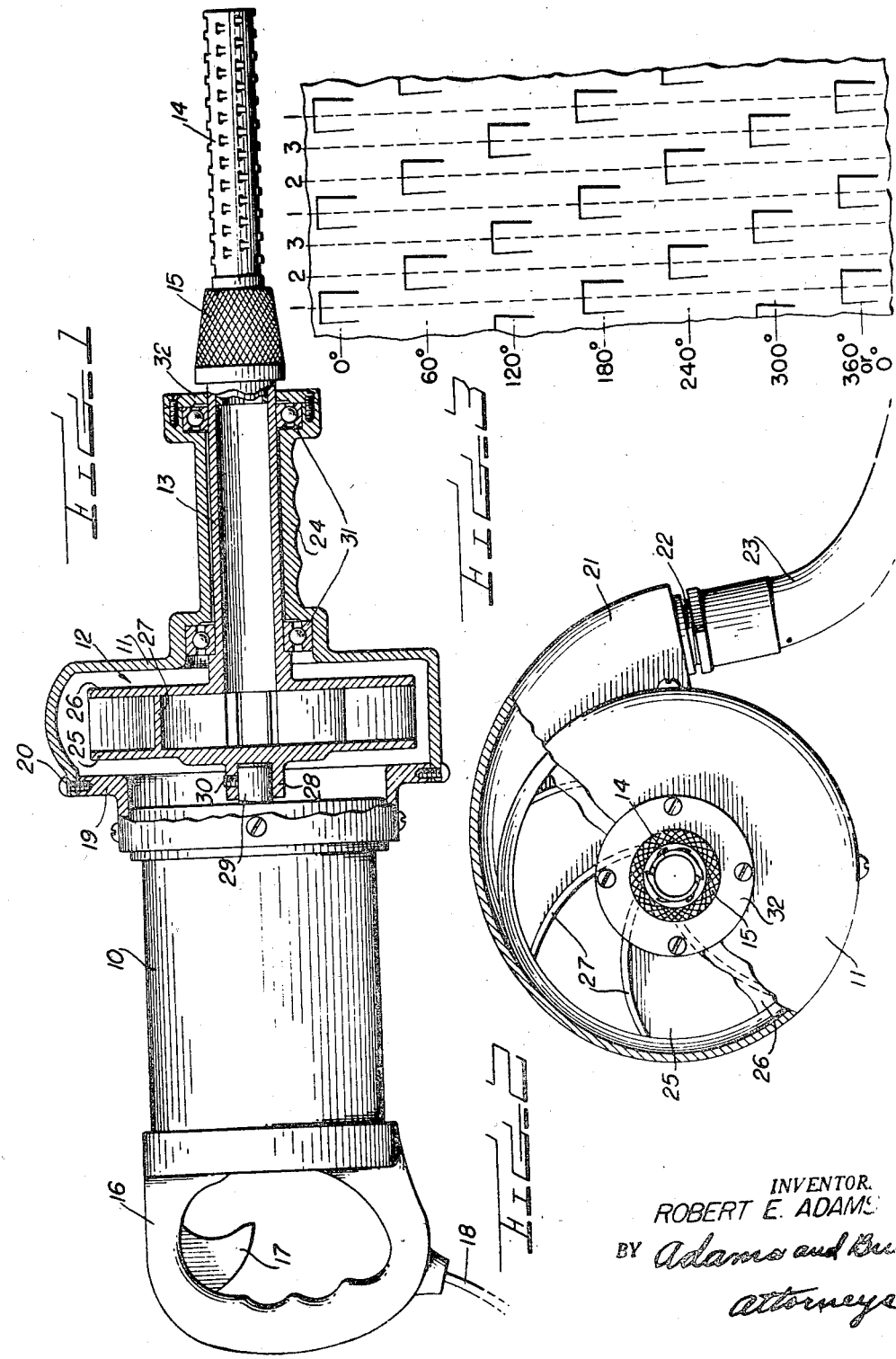

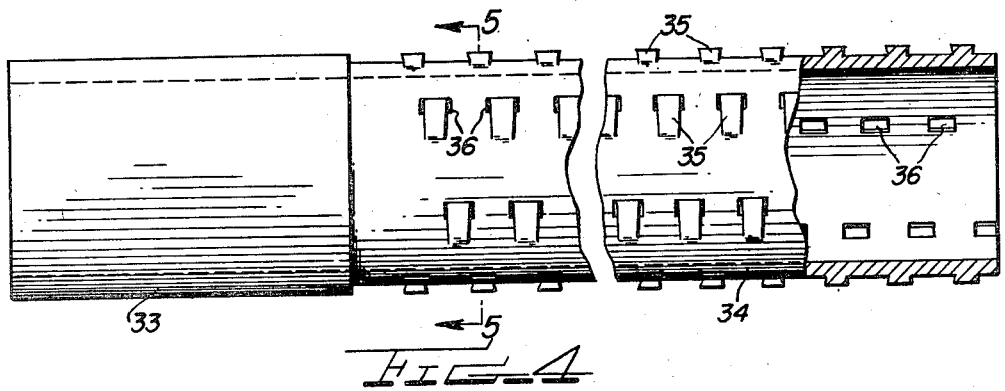
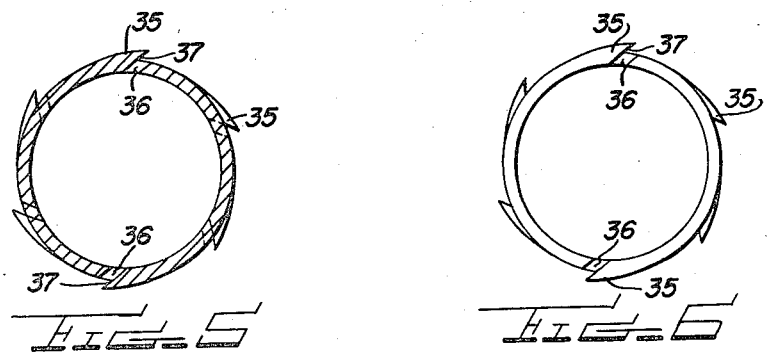
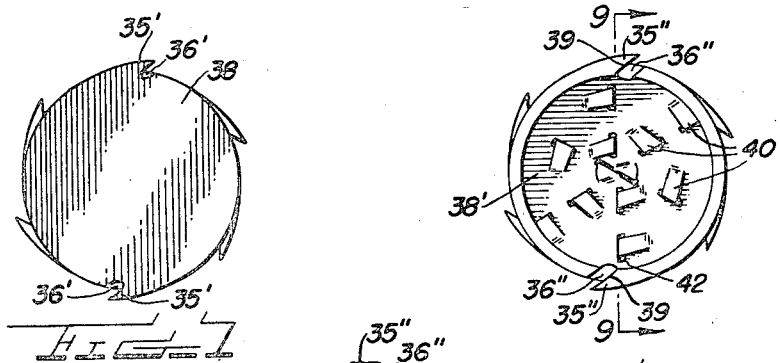
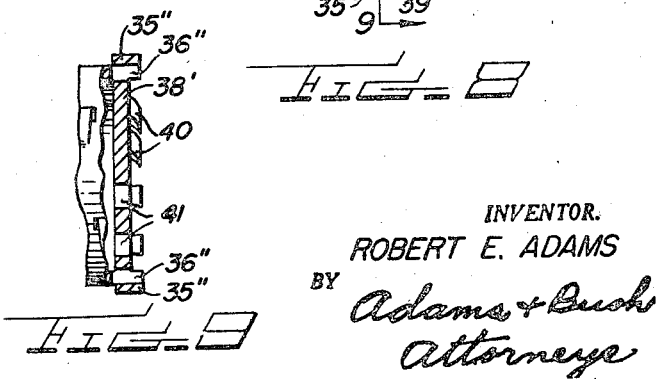

2,437,668

UNITED STATES PATENT OFFICE 2,437,668

POWER-DRIVEN ROTARY CYLINDRICAL SAW

Robert E. Adams, McDonough, Ga., assignor of one-half to Richard P. Bernhardt, McDonough, Ga.

Application April 29, 1946, Serial No. 665,785

2 Claims. (Cl. 143—43)

This invention relates to rotary saws and has more particular reference to high speed power driven rotary saws.

When sawing down timber in the woods, in limbing and in cutting up tree trunks, the present types of saws, whether power driven or manually operated, or whether of the rotary cutting disc type or of the push and pull cross-cut type, all suffer from the common defect of being pinched or bound by the opposing surfaces of the cut wood pressing on the cutting blade, thereby temporarily stopping the sawing operation.

One of the objects of the present invention is to provide a rotary saw that will be pinch-proof.

Another object of the invention is to provide a rotary saw adapted to be used for all types of cutting, shaping, milling, or other sawing operations ordinarily done in a wood working shop.

Another object of the invention is to provide a portable high speed power driven rotary saw, in which the cutting tool is readily removed and replaced.

Another object of the invention is to provide a high speed power driven rotary saw in which the cutting member comprises a hollow body having a plurality of cutting teeth arranged on its outer surface and a plurality of openings on its outer surface communicating with the hollow interior to permit the saw dust to pass into the interior of the body.

Another object of the invention resides in providing a high speed power driven rotary saw of the above character in which means are provided for removing the saw dust from the interior of the hollow body.

Another object of the invention resides in providing a high speed power driven rotary saw of the above character in which the means for removing the saw dust from the interior of the hollow body are operated by the power driving means.

Another object of the invention resides in providing a high speed power driven rotary saw of the above character in which the cutting teeth are so arranged on the surface of the hollow body that no part of the wood is left uncut in the path of the advancing saw.

A further object of the invention is to provide a rotary saw which is a rugged and well balanced cutting tool, efficient in operation and easily manipulated with respect to the work.

With the foregoing and other objects in view, the invention consists in the construction, combination and arrangement of parts hereinafter described and illustrated in the accompanying drawings, in which:

Fig. 1 is a side elevation, partly broken away, of a power driven rotary saw in accordance with this invention;

Fig. 2 is an end view of the power driven rotary saw shown in Fig. 1;

Fig. 3 is a fragmentary diagrammatical, development view of the rotary saw, showing the arrangement of the teeth;

Fig. 4 is an enlarged side elevation, partly broken away, of the saw shown in Fig. 1;

Fig. 5 is a vertical cross sectional view taken on the line 5—5 of Fig. 4;

Fig. 6 is an end view of the rotary saw shown in Fig. 4;

Fig. 7 is an end view of a rotary saw similar to that shown in Fig. 4, but having a closed end;

Fig. 8 is an end view of a rotary saw similar to that shown in Fig. 4, but having a closed end provided with cutting teeth; and Fig. 9 is a sectional view taken on the line 9—9 of Fig. 8, and showing a partly broken away portion of the cylinder in side elevation.

In Fig. 1, there is shown a portable, high speed power driven rotary saw constructed in accordance with this invention and comprising a housing 10 for a motor, which may be either electric or turbine, in the particular embodiment shown, the motor is a high speed electric motor; a fan housing 11 mounted on the motor housing; a rotary fan 12 attached to the armature shaft of the motor and having an elongated hollow shaft 13 projecting therefrom; and a hollow rotary saw 14 detachably connected to the hollow shaft 13, as by means of a collet 15.

The motor housing 10 is provided with a grip handle 16 which houses a trigger switch 17 for controlling the supply of energy to the motor in the housing 10. An extension cord 18 projects from the grip handle 17 and is adapted to be connected to a source of electrical supply, not shown.

Suitably secured to the forward end of the motor housing 10 is a flanged ring 19, to which is detachably fastened, as by means of screws 20, the fan housing 11. The fan housing 11 is provided with an exhaust outlet 21 having a threaded connection 22 to which a hose 23 may be detachably connected for a purpose hereinafter to be described. That portion of the housing 11 which houses the hollow shaft 13 is provided with a suitable hand grip 24.

The fan 12 is of the exhaust or suction type and comprises a spaced pair of discs 25 and 26 having a plurality of vanes 27 mounted therebetween and welded to the inner surface of each disc. A short, hollow stub shaft 28, formed integral with the rear disc 25, receives the end 29 of the armature shaft of the motor and is detachably connected thereto, as by means of set screw 30. The hollow shaft 13 is journaled within the housing 11 by means of a spaced pair of ring roller bearings 31 mounted therein, and extends through an opening in the cover plate 32, suitably secured to the forward end of the housing 11.

The rotary saw 14 comprises a hollow cylindrical member having an attaching portion 33 adapted to fit within the outer open end of hollow shaft 13 and a cutting portion 34 provided with a plurality of circumferentially spaced, longitudinally extending rows of integral tangentially projecting saw teeth 35. The rotary saw is preferably made of tool steel with the tips of the teeth tempered and hardened. In the particular embodiment shown, each tooth 35 is formed with a width greater than its height and with an inclined forward wall 37 overhanging a square opening 36 leading into the hollow interior of the cylinder. The particular shape of the teeth is clearly shown in Figs. 4 and 5. Each square opening 36 extends through the walls of the cylinder obliquely, as clearly shown in Figs. 5 and 6, the inclined front wall of the tooth forming the rear wall of the opening. The size and number of the teeth in relation to the length and diameter of the cylinder is determined by the use for which the particular rotary saw is designed. The particular arrangement of the teeth on the outer surface of the cylinder is diagrammatically shown in Fig. 3, where a portion of the cylinder is developed. Here the length of the cylinder is divided into segments indicated by the numerals 1, 2, 3. Two teeth are formed in each segment and are spaced 180° apart, the teeth in each segment have a slight lateral overlap of the teeth in each adjacent segment. This insures that no part of the wood is left uncut as the saw revolves. In addition, the teeth in each segment are angularly spaced from those in the preceding segment. In this particular embodiment of the invention they are shown as being angularly spaced by 60°. In the particular arrangement shown there are six parallel, horizontally extending rows angularly spaced 60° apart.

The free end of the cylinder is open, as shown in Fig. 6, and the two teeth in the last segment are flush with the end of the cylinder. The operation of the device is as follows:

The operator places one hand on the motor handle grip 16 and the other hand on the hand grip 24 adjacent the rotary saw. The trigger switch 17 is moved to start the motor and with the rotary saw rotating at a high speed, preferably 6000 revolutions per minute, or better, it is pushed into the tree or material to be cut. The saw dust enters the hollow interior of the rotary saw through the openings 36, from which it is sucked out by the rotary suction fan 12 and discharged through the outlet 21. With high speed rotation of the cutting tool, the saw dust or particles of wood cut by each tooth is very fine, almost powder-like, and is easily airborne. It is this high speed, plus the removal of the saw dust from within the hollow saw, that makes the saw pinchproof. As the wood settles about the saw in a pinching operation, the rotary saw merely cuts its own shape in the wood and continues spinning and cutting without interruption.

If considered desirable, a hose 23 may be connected to the outlet 21 to deposit the saw dust in a suitable container removed from the scene of the cutting. Also, at times, it may be desirable to connect the hose 23 to a large suction pump to help the fan 12 remove the saw dust from the cutting tool. This is particularly desirable when the cutting tool is of extreme length, such as thirty or forty inches, otherwise the fan would have to be of such size as to make it difficult for one person to operate the tool.

In Fig. 7 there is shown a modification of the rotary saw. In this particular modification, the rotary saw is of identical construction to that shown in Figs. 4, 5 and 6, with the exception that the end of the saw away from the power unit is closed by a disc 38. This disc may be formed integral with the cylinder or welded thereto. This modification will provide greater suction through the openings under the teeth and will prevent dirt and other extraneous matter from entering the hollow interior of the rotary saw. In this construction it is preferable that the square openings 36' under the two teeth 35' in the last circular row or segment be cut at an angle inclined to the plane of the disc 38, as shown in Fig. 7, as the disc 38 is directly under the last two teeth.

In Figs. 8 and 9 there is shown a second modification of the rotary saw, which is of identical construction to that shown in Figs. 4, 5 and 6, with the exception that the end of the saw away from the power unit is closed by a disc 38' and that the teeth in the last circular row or segment are provided with a side cutting edge 39. This disc may be formed integral with the cylinder or welded thereto. The disc 38' is located within the cylinder and spaced from the free end thereof, as shown in Fig. 9, and it is provided with a plurality of concentric rows of cutting teeth 40. Each tooth is of similar shape and construction to the teeth shown in Figs. 4, 5 and 6, and each tooth overhangs an inclined square opening 41 leading into the hollow interior of the cylinder. Each concentric row consists of two teeth 180° apart. The teeth in each row are angularly offset from the teeth in the preceding row and have a slight lateral overlap of the teeth in the preceding row. The two teeth 35" on the last circular row or segment are provided with side cutting edges 39 which are located in the same vertical plane as the tips of the cutting edges of the teeth 40 on the disc 38'. The two square openings 36" under the two teeth 35" on the last circular segment lead into the hollow interior of the cylinder and, in addition, open on the front face of the disc 38'. Also, the side cutting edges 39 of these two teeth 35" extend down the side of the teeth a sufficient distance to insure that there shall not be any ridge of wood left between their cutting path and the cutting path of the teeth in the first concentric row on the disc 38', all as clearly shown in Figs. 8 and 9. This particular modification of the rotary saw is particularly adapted for boring holes and cutting grooves in wood working. The cutting tool is pressed vertically into the wood to be grooved to the desired depth and then moved laterally in the direction in which it is desired to make the groove.

While the openings in front of the base of the teeth have been shown as square in all modifications of the rotary saw shown, obviously, they could be made round or of any configuration, the essential requirement being that they be slightly larger than any chips that the teeth could cut. In the construction shown, the width of the square opening is slightly larger than the width of the tooth.

Obviously, the invention is not restricted to the particular embodiments hereof herein shown and described. Moreover, it is not indispensable that all of the features of the invention be used conjointly, since they may be employed advantageously in various combinations and sub-combinations.

What is claimed is:

1. In a portable power-operated rotary cutting tool, a casing having a motor housing at its rear provided with a hand grip and a hollow portion at its front provided with an exit opening and an elongated tubular extension forming a second hand grip, a motor in said housing, a suction fan connected to said motor mounted in said hollow portion and having a tubular shaft projecting through said tubular extension, a tubular cutting member detachably connected to said tubular shaft and having its hollow interior communicating with the hollow interior of said shaft, said tubular cutting member having a plurality of cutting teeth formed on its outer surface and having an opening located beneath each tooth leading into its hollow interior, whereby, when said tool is operated, the saw dust will be sucked through said openings in the tubular cutting member, pass through the tubular shaft and be expelled through the exit opening in the casing.

2. A portable power-operated rotary cutting tool, as set forth in claim 1, wherein said tubular cutting member is closed at its outer end, said closed end having a plurality of teeth formed thereon and having an opening located beneath each tooth leading into the hollow interior of the cutting member.

ROBERT E. ADAMS.

REFERENCES CITED

The following references are of record in the file of this patent:

UNITED STATES PATENTS

| Number | Name | Date |
|---|---|---|
| 184,446 | Treibal | Nov. 14, 1876 |
| 716,557 | Klingensmith | Dec. 23, 1902 |
| 754,350 | Shaull | Mar. 8, 1904 |
| 839,465 | Freese | Dec. 25, 1906 |
| 1,002,678 | Grondahl | Sept. 5, 1911 |
| 1,311,265 | Dodge | July 29, 1919 |
| 1,652,820 | Evans | Dec. 13, 1927 |